(12) United States Patent
Siegwart et al.

(10) Patent No.: US 10,678,557 B2
(45) Date of Patent: Jun. 9, 2020

(54) GENERATING A PREDICTED PROFILE FOR TARGET CODE BASED ON A PROFILE OF SAMPLED CODE

(71) Applicant: INTERNATIONAL BUSINESS MACHINES CORPORATION, Armonk, NY (US)

(72) Inventors: David K. Siegwart, Eastleigh (GB); Allan H. Kielstra, Ajax (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1 day.

(21) Appl. No.: 16/160,427

(22) Filed: Oct. 15, 2018

(65) Prior Publication Data
US 2020/0117469 A1    Apr. 16, 2020

(51) Int. Cl.
G06F 9/44        (2018.01)
G06F 9/445       (2018.01)

(52) U.S. Cl.
CPC .................... G06F 9/445 (2013.01)

(58) Field of Classification Search
CPC ............... G06F 9/44; G06F 9/45; G06F 9/445
See application file for complete search history.

(56) References Cited

U.S. PATENT DOCUMENTS

| | | | |
|---|---|---|---|
| 6,275,981 B1 | 8/2001 | Buzbee et al. | |
| 8,370,821 B2 * | 2/2013 | Haber | G06F 8/4441 717/151 |
| 8,387,026 B1 | 2/2013 | Hundt et al. | |
| 9,535,673 B1 | 1/2017 | Cui et al. | |
| 2002/0196678 A1 * | 12/2002 | Haber | G06F 9/4486 365/200 |
| 2015/0067170 A1 * | 3/2015 | Zhang | H04L 47/70 709/226 |

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.
IBM, "z/Architecture—Principles of Operation," IBM Publication No. SA22-7832-11, Twelfth Edition, Sep. 2017, pp. 1-1902.
Schmidt, W.J. et al., "Profile-directed Restructuring of Operating System Code," IBM Systems Journal, vol. 37, No. 2, Feb. 1998, pp. 270-297.

* cited by examiner

*Primary Examiner* — Jae U Jeon
(74) *Attorney, Agent, or Firm* — Noah Sharkan, Esq.; Blanche E. Schiller, Esq.; Heslin Rothenberg Farley & Mesiti P.C.

(57) ABSTRACT

A predicted profile is generated for target code to be executed on a processor of the computing environment. The predicted profile is based on a profile of sampled code. The sampled code is a different version of code than the target code and is a complex build of modules for which it is difficult to determine which versions of the modules have been profiled. Based on the predicted profile for the target code, a determination is made of predicted execution information for the target code. Based on the determining the predicted execution information for the target code, an action is performed to facilitate processing within the computing environment.

20 Claims, 8 Drawing Sheets

| | 306 TARGET MASKED DISASSEMBLY | 308 SAMPLED MASKED DISASSEMBLY | 310 SAMPLED HISTOGRAM COUNT | | 302 TARGET HISTOGRAM COUNT | 312 |
|---|---|---|---|---|---|---|
| 304 | JNO, xx | JNO, xx | 5 | --> | 5 | 320 |
| | TM, xx, xx | TM, xx, xx | 6 | --> | 6 | |
| | JNZ, xx | JNZ, xx | 1 | --> | 1 | |
| | OI, xx, xx | OI, xx, xx | 2 | --> | 2 | |
| | | LG, xx, VARIABLEA | 7 | X | | 322 |
| | TM, VARIABLEB, xx | TM, VARIABLEB, xx | 4 | --> | 4 | |
| | JZ, xx | JZ, xx | 9 | --> | 9 | |
| | ... | ... | ... | ... | ... | |
| | LA, xx, xx | LA, xx, xx | 2 | --> | 2 | |
| | STG, xx, xx | | | | 0 | 324 |
| | LG, xx, xx | LR, xx, xx | 8 | X | 0 | 326 |
| | LG, xx, xx | | | | 0 | |
| | LA, xx, xx | LA, xx, xx | 4 | --> | 4 | |
| | LAY, xx, xx | LG, xx, VARIABLEC | 3 | X | 0 | |

| TARGET MASKED DISASSEMBLY | SAMPLED MASKED DISASSEMBLY | SAMPLED HISTOGRAM COUNT | | TARGET HISTOGRAM COUNT | |
|---|---|---|---|---|---|
| JNO, xx | JNO, xx | 5 | --> | 5 | ~320 |
| TM, xx, xx | TM, xx, xx | 6 | --> | 6 | |
| JNZ, xx | JNZ, xx | 1 | --> | 1 | |
| OI, xx, xx | OI, xx, xx | 2 | --> | 2 | |
| | LG, xx, VARIABLEA | 7 | X | | ~322 |
| TM, VARIABLEB, xx | TM, VARIABLEB, xx | 4 | --> | 4 | |
| JZ, xx | JZ, xx | 9 | --> | 9 | |
| ... | ... | ... | ... | ... | |
| LA, xx, xx | LA, xx, xx | 2 | --> | 2 | |
| STG, xx, xx | | | | 0 | ~324 |
| LG, xx, xx | LR, xx, xx | 8 | X | 0 | ~326 |
| LG, xx, xx | | | | 0 | |
| LA, xx, xx | LA, xx, xx | 4 | --> | 4 | |
| LAY, xx, xx | LG, xx, VARIABLEC | 3 | X | 0 | |

Column headers: 306, 308, 310, 312. 304 points to rows. 302 indicates table.

GENERATING A PREDICTED PROFILE FOR TARGET CODE BASED ON A PROFILE OF SAMPLED CODE

BACKGROUND

One or more aspects relate, in general, to processing within a computing environment, and in particular, to facilitating such processing within the computing environment.

In one example, processing within a computing environment includes running programs to perform certain tasks, and ensuring that those programs are running as expected and efficiently, in order to facilitate processing within the processors running those programs.

Users of compiled programs and compilers often wish to understand the performance of the user code. A test case representing an expected execution context is used to drive the program, and profile information is collected. The profile information typically includes histograms of the machine instructions executing and of the branches taken. Execution hot spots can be inferred using those histograms, either by inspection in a performance visualization tool or by compiler optimization techniques.

A problem occurs, however, in complex builds of the compiled programs when users are not able to track exactly which source and object modules were used and linked into the programs they profiled. Thus, when the profile is used to determine how it affected the performance of the product, and therefore, computing environment, it is difficult to determine which version of the code was affected.

Therefore, performance analysts often have to carry out complex manual steps, using esoteric features of the code and eyecatchers to determine the version of the code profiled. This can be cumbersome, time consuming and error prone.

SUMMARY

Shortcomings of the prior art are overcome and additional advantages are provided through the provision of a computer program product for facilitating processing within the computing environment. The computer program product includes a computer readable storage medium readable by a processor and storing instructions for performing a method. The method includes generating a predicted profile for target code to be executed on the processor of the computing environment. The predicted profile is based on a profile of sampled code. The sampled code is a different version of code than the target code and is a complex build of modules for which it is difficult to determine which versions of the modules have been profiled. Based on the predicted profile for the target code, a determination is made of predicted execution information for the target code. Based on determining the predicted execution information for the target code, an action is performed to facilitate processing within the computing environment.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with an aspect of the present invention, a capability is provided for facilitating processing within a computing environment. For example, a capability is provided to predict a profile for code (referred to herein as target code) when, for instance, it would be difficult, impractical, undesirable or not possible to profile that code. The predicted profile is then analyzed to determine whether there are inefficiencies in the target code or processing of the target code that may be corrected to improve processing within the processor (or multiple processors) on which the code will run. By changing the code or processing of the code, the processor itself is improved, by, for instance, increasing processing speed or reducing the amount of memory used when the code is run; thus, facilitating processing within the computing environment.

In one embodiment, to predict the profile for the target code, a profile previously generated for another version of the code (referred to herein as sampled code) is used. The profile for the sampled code specifies histogram information, including, for instance, instructions executed, a count for each instruction, branches taken, etc., for the source and object modules profiled. Both the target code and the sampled code are complex builds of compiled programs, in which it may be difficult to determine which source and object modules were used and linked into the programs. Thus, in accordance with an aspect of the present invention, instead of tracking down the exact version of the previously sampled code, the profile of the sampled code is used to produce a predicted profile of the target code. That predicted profile is then used to analyze the target code and take actions to correct, improve and/or optimize that code to improve processing within the computing environment.

In one example, the target code is the latest version of the code (for a particular product or code build) in the code repository. In a further example, the target code is either an earlier or later version of the sampled code (e.g., slightly earlier or later, as predefined). In yet a further example, the target code is within an acceptable time period from the sampled code (e.g., within a few days) or has a few changes made to one or more of the modules (e.g., a predefined acceptable number of changes or changes within a defined scope). A comparison of the sampled code profile and the predicted profile is performed and those parts of the sampled profile that match are used to annotate the target code predicted profile; those that do not match are discarded. This effectively produces a new predicted profile of the target code based on a profile of the sampled code. If the discarded part of the profile is minimal (as defined), the predicted profile of the target code is considered accurate. In particular, as one example, the proportion of the old histogram that is transferred to a new predicted histogram is often a good predictor of how close the performance profile of the predicted histogram will match its actual profile if it was sampled.

The new predicted profile of the target code may be used for carrying out profile directed feedback on the target code, or for displaying the predicted profile of the target code. Other examples are also possible.

One embodiment of a computing environment to incorporate and use one or more aspects of the present invention is described with reference to FIG. 1A. In one example, the computing environment is based on the z/Architecture, offered by International Business Machines Corporation, Armonk, N.Y. One embodiment of the z/Architecture is described in "z/Architecture Principles of Operation," IBM Publication No. SA22-7832-11, $12^{th}$ edition, September 2017, which is hereby incorporated herein by reference in its entirety. The z/Architecture, however, is only one example architecture; other architectures and/or other types of computing environments may include and/or use one or more aspects of the present invention.

Figure 1A:
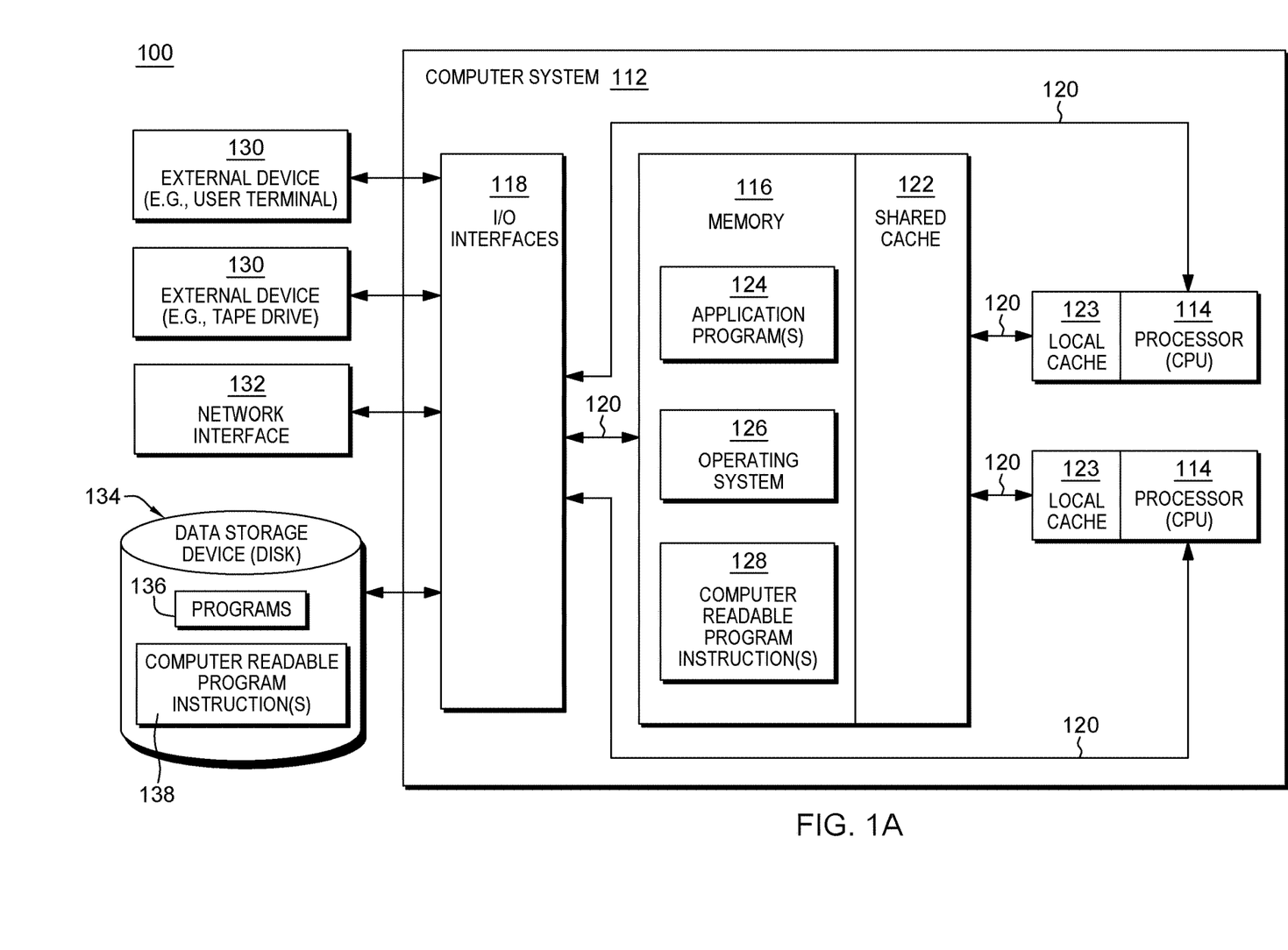
FIG. 1A depicts one example of a computing environment to incorporate and use one or more aspects of the present invention.

As shown in FIG. 1A, a computing environment 100 includes, for instance, a computer system 112 shown, e.g., in the form of a general-purpose computing device. Computer system 112 may include, but is not limited to, one or more processors or processing units 114 (e.g., central processing units (CPUs)), a memory 116 (a.k.a., system memory, main memory, main storage, central storage or storage, as examples), and one or more input/output (I/O) interfaces 118, coupled to one another via one or more buses and/or other connections 120.

Bus 120 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 116 may include, for instance, a cache 122, such as a shared cache, which may be coupled to local caches 123 of processors 114. Further, memory 116 may include one or more programs or applications 124, an operating system 126 (e.g., such as z/OS, offered by International Business Machines Corporation, or other operating systems), and one or more computer readable program instructions 128. Computer readable program instructions 128 may be configured to carry out functions of embodiments of aspects of the invention.

Computer system 112 may also communicate via, e.g., I/O interfaces 118 with one or more external devices 130, one or more network interfaces 132, and/or one or more data storage devices 134. Example external devices include a user terminal, a tape drive, a pointing device, a display, etc. Network interface 132 enables computer system 112 to communicate with one or more networks, such as a local area network (LAN), a general wide area network (WAN), and/or a public network (e.g., the Internet), providing communication with other computing devices or systems.

Data storage device 134 may store one or more programs 136, one or more computer readable program instructions 138, and/or data, etc. The computer readable program instructions may be configured to carry out functions of embodiments of aspects of the invention.

Computer system 112 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 112. Examples, include, but are not limited to: microcode, device drivers, redundant processing units, external disk drive arrays, RAID systems, tape drives, and data archival storage systems, etc.

Computer system 112 may be operational with numerous other general purpose or special purpose computing system environments or configurations. Examples of well-known computing systems, environments, and/or configurations that may be suitable for use with computer system 112 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In one example, a processor, such as processor 114, may execute one or more components (also referred to as engines) to perform one or more aspects of the present invention. These components may be stored in memory, including main memory (e.g., memory 116) and/or one or more caches (e.g., shared cache 122, local cache 123) and/or external storage (e.g., device 134), and may be executed by one or more processors (e.g., processor 114).

Figure 1B:
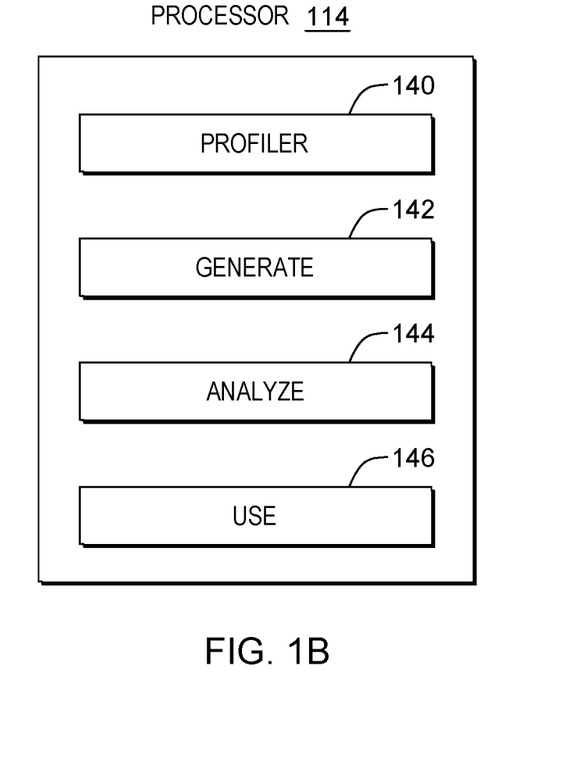
FIG. 1B depicts further details of a processor of FIG. 1A, in accordance with one or more aspects of the present invention.

In one example, referring to FIG. 1B, the components may include a profiler 140 to perform profiling of a program (e.g., sampled code) running on a processor of the computing environment; a generate component 142 to generate a predicted profile for target code, in accordance with an aspect of the present invention; an analyze component 144 to analyze the predicted profiled to determine areas of concern or optimization potential in the target code; and a use component 146 to use the results from the analysis to at least initiate changing the target code or processing of the target code to facilitate processing within the computing environment, improving performance therein.

Further details relating to profiling processing, in accordance with one or more aspects of the present invention, are described with reference to FIG. 2. The processing is performed, for instance, by one or more components of a processor (e.g., processor 114), including but not limited to, profiler component 140, generate component 142, analyze component 144 and/or use component 146.

Figure 2:
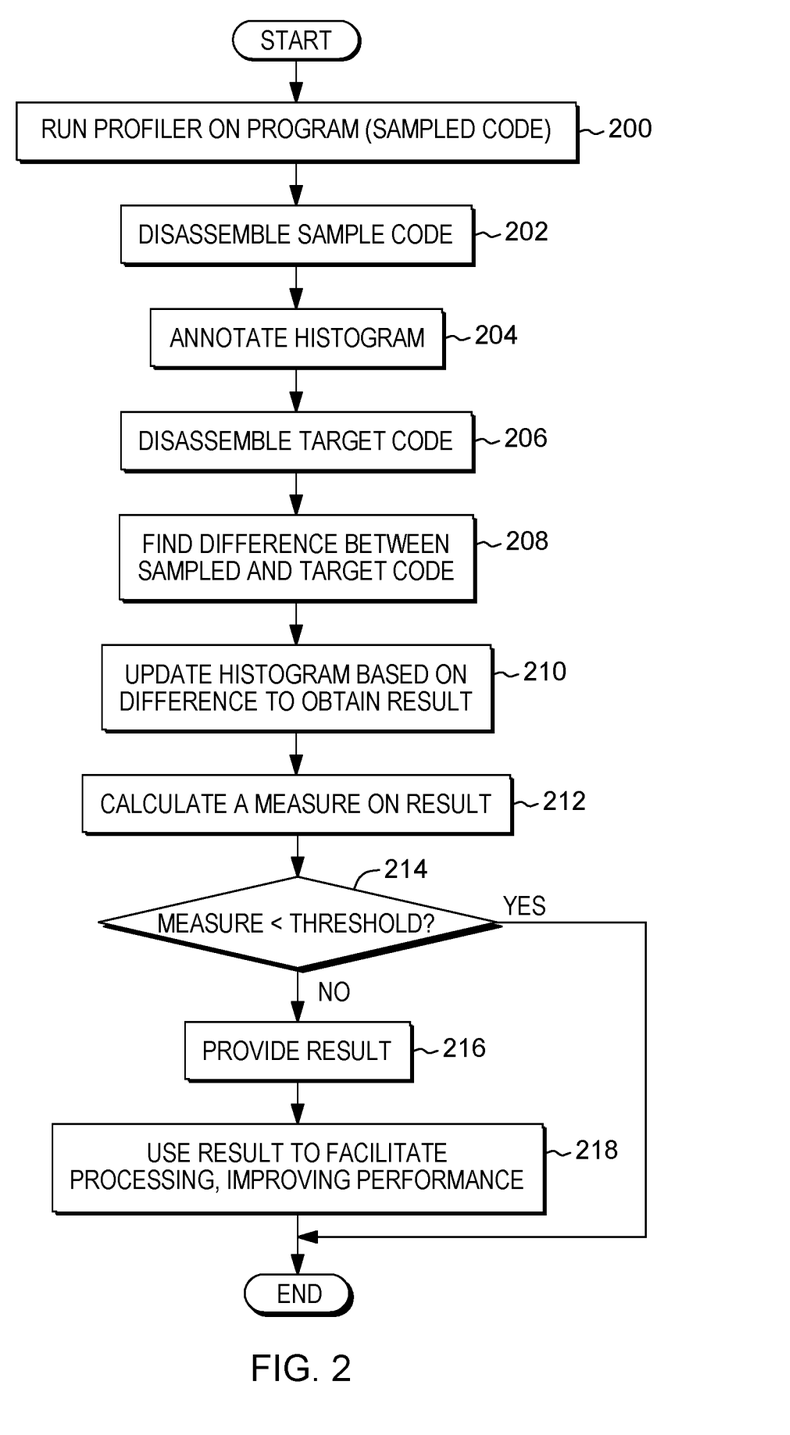
FIG. 2 depicts one example of profile processing used to provide a predicted profile, in accordance with one or more aspects of the present invention.

Referring to FIG. 2, initially, a profiler (e.g., using profiler component 140) is run on a program executing on a processor (e.g., processor 114), STEP 200. The program is referred to herein as sampled code and includes one or more modules. As one example, the program is a complex build of a plurality of object and/or source modules. The profiler gathers information relating to, for instance, instructions and branches taken within the sampled code. For example, the profiler captures a disassembly or original binary of the executed instructions (i.e., individual instructions executed), STEP 202. These instructions are z/OS machine instructions, in one example, but in other examples, they may be other types of instructions, such as intermediate level instructions, source level instructions, instructions of other operating systems, etc.

Figure 3:
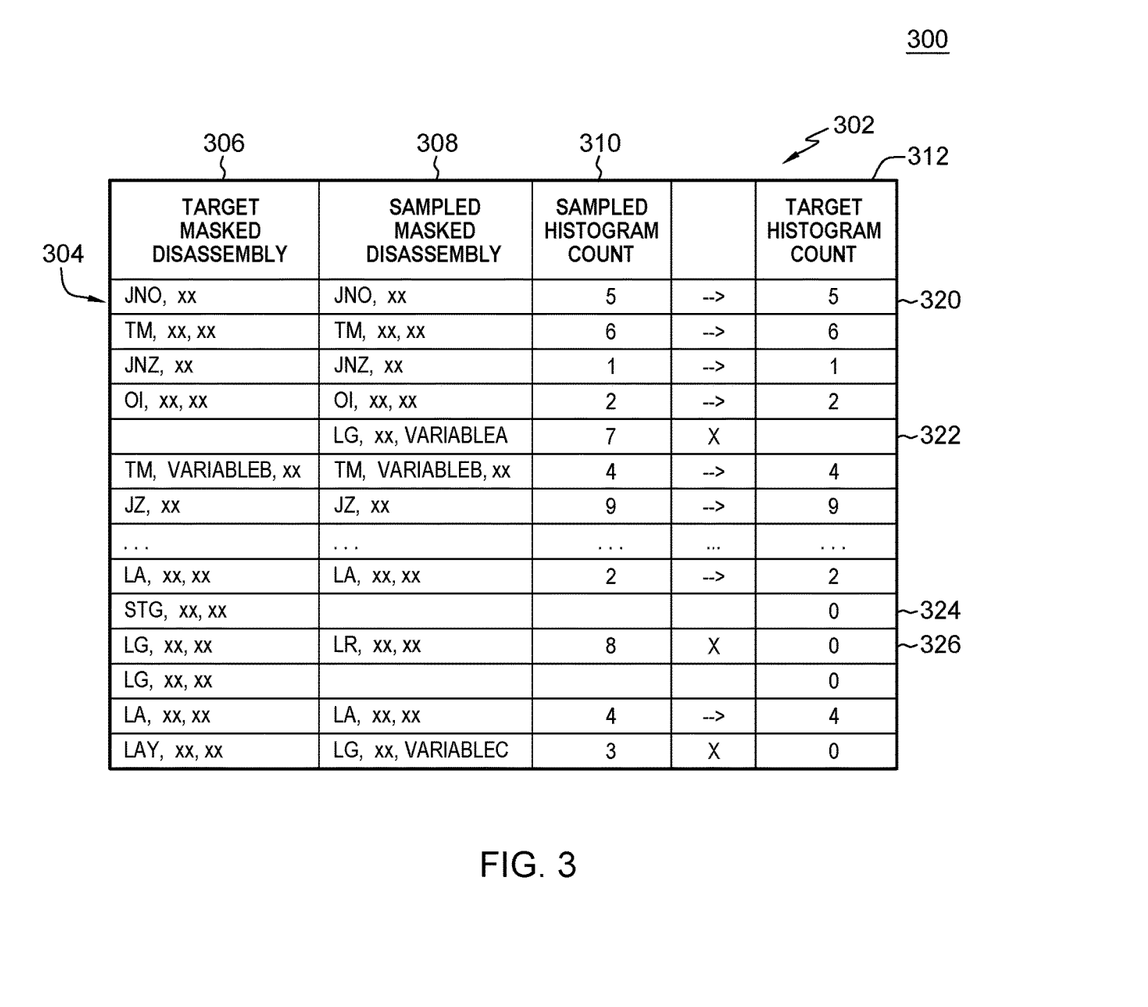
FIG. 3 depicts one example of histogram information used to provide the predicted profile, in accordance with an aspect of the present invention.

The disassembled instructions and information associated therewith are included in a histogram table, STEP 204. One example of such a histogram table is depicted in FIG. 3. As shown in FIG. 3, a histogram table 300 includes a plurality of columns 302 and a plurality of rows 304. In this example, the plurality of columns 302 includes target masked disassembly column 306, sampled masked disassembly column 308, sampled histogram count column 310, and target histogram count column 312, each of which is described below.

The sampled masked disassembly column 308 includes, for instance, the disassembled instructions of the sampled code captured by the profiler. Each row of sampled mask disassembly column 308 includes an instruction, such as a machine instruction of the sampled code, in this example. Each of the x's (e.g., xx) is a mask of an operand of the instruction, such as a register identifier, since the operands often are different with code changes, even small code changes. Sampled histogram count column 310 includes a count of the number of times the instruction of that row was sampled in the program being profiled.

Returning to FIG. 2, at some point, e.g., subsequent to profiling the sampled code and creating the target code, processing to generate the predicted profile for the target code is performed. The target code is, for instance, a complex build of a plurality of modules, one or more of which are at a different version level than one or more of the modules of the sampled code. Thus, the sampled code and the target code are at different version levels.

In one example, a component of the processor (e.g., processor 114), such as generate component 142 or another component of the processor, disassembles the target binary code, STEP 206. This includes, for instance, determining the instructions of the target binary code. In one example, there is one line of disassembly per instruction.

In one example, as with the sampled code disassembly, the target code disassembly masks certain values with x's. For instance, x's are used to mask those values that vary in the presence of small code changes, such as, for instance, exact registers used, names of temporary variable names that the compiler introduced, etc.

Thereafter, a component of the processor, such as generate component 142 or another component of the processor, determines a difference between the sampled disassembly and the target disassembly, STEP 208. In one example, a longest common subsequence (LCS) algorithm (e.g., Myers' algorithm for the Longest Common Subsequence) is used to find matches on a line by line basis. Results of the LCS algorithm are used by generate component 142 or another component of the processor to, e.g., update histogram table 300, e.g., target masked disassembly column 306. The target instructions are, for example, lined up with matched sampled instructions, if any, based on the results of the LCS algorithm.

Based on the determined differences, generate component 142 or another component of the processor updates histogram table 300 and provides a predicted profile as a result, STEP 210. For instance, for each row in which the disassembly of the target code matches the disassembly of the sampled code, the relevant profile information is transferred from sampled histogram count column 310 to target histogram count column 312. For instance, for row 1 (320), since the target masked disassembly instruction JNO is the same as sampled mask disassembly instruction JNO, the number 5 (which is a count of the number of times JNO of the sampled code was sampled) is copied, moved, or transferred from sampled histogram count column 310 to target histogram count column 312. If, however, an instruction in sampled masked disassembly column 308 is not in target masked disassembly column 306, then no value is copied, moved or placed in target histogram count 312 (see, e.g., row 5 (322)). Additionally, if there is a target masked disassembly instruction in column 306 that is not in sampled masked disassembly instruction column 308 (see, e.g. row 10 (324) or if the instructions in the rows are different (e.g., row 11 (326)), then a zero, as an example, is placed in target histogram count column 312. This updated histogram (e.g., columns 306 and 312) is used to provide a predicted histogram of machine instructions executed and branches taken for the target code; i.e., a predicted profile.

Based on providing the resulting updated histogram, a component of the processor (e.g., processor 114), such as generate component 142 or another component of the processor, calculates a measure of the updated histogram to determine the accuracy of the predicted profile, STEP 212. In one example, this measure is a proportion of the new histogram (for the target code) that is the same as the old histogram (for the sampled code).

Generate component 142 or another component of the processor determines whether the measure has a predetermined relationship (e.g., less than) with a threshold value, INQUIRY 214. If the measure has the predetermined relationship with the threshold value, then the profile is considered inaccurate, and processing exits without a result (i.e., no predicted profile is output). On the other hand, if the measure does not have the predetermined relationship with the threshold (e.g., it is greater than or equal to the threshold), then the new histogram for the target code is considered accurate and is provided as the predicted profile for the target code, STEP 216.

Although in the above example, the predetermined relationship is less than, in other embodiments, it can be other relationships, such as, but not limited to, less than or equal, equal, greater than, or greater than or equal. Many examples are possible.

In one example, subsequent to generating the predicted profile for the target code, the predicted profile is used to facilitate processing within the computing environment, improving performance therein, STEP 218. For instance, the predicted profile is analyzed, and based on the analysis, one or more code changes or other processing changes may be performed, as described in further detail with reference to FIG. 4.

Figure 4:
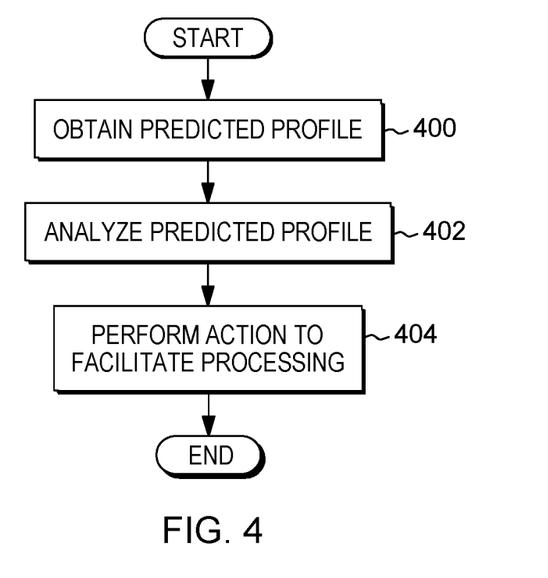
FIG. 4 depicts one example of using the predicted profile to facilitate processing within the computing environment, in accordance with an aspect of the present invention.

Referring to FIG. 4, in one example, a component of a processor (e.g., processor 114), such as analyze component 144 or another component of the processor, obtains (e.g., is provided, retrieves, receives, locates, etc.) the predicted profile, STEP 400. In one example, the analyze component includes, for instance, a performance analysis tool, a performance visualization tool, or an optimization tool, etc. Analyze component 144 (or another component of the processor) analyzes the predicted profile looking for areas of concern or potential optimization areas, such as hot spots, errors, code that may be optimized, etc., STEP 402.

Thereafter, a component of a processor (e.g., processor 114), such as use component 146 or another component of the processor, obtains (e.g., receives, retrieves, is provided, locates, etc.) a result of the analysis and performs an action to facilitate processing within the computing environment, STEP 404. For instance, the component initiates revision of the target code or processing within the computing environment (e.g., logic flow) to improve the code and/or the processor(s) executing the code. This includes, for instance, providing an indication of changes to be made to the code or processing, and/or automatically performing the revisions.

One or more aspects of the present invention are inextricably tied to computer technology and facilitate processing within a computer, improving performance thereof. In one or more aspects, a predicted profile is generated for target code and used to predict execution information for the target code. This information includes, for instance, the instructions of the target code to be executed and a predicted count of the number of times the instructions would be sampled, an amount of central processing unit cycles or time to be used in executing the target code, branches to be taken, etc. The instructions to be executed and counted may be low level machine instructions, intermediate level instructions, source level instructions or any other representation of code.

In one or more aspects, the predicted profile is created for target code, based on it being difficult or undesirable to perform profiling for the code (e.g., run the code with a profiler). To obtain the predicted profile, a profiler is executed on sampled code that gathers a histogram of machine instructions executed and branches taken for the sampled code and captures one of a disassembly or an original binary of the machine instructions executed, as annotated by the histogram of the machine instructions. Further, a target binary code is disassembled to mask where a value varies in presence of code changes of a predetermined size. A comparison is made between a sampled disassembly and a target disassembly to identify a difference, using, e.g., a longest common subsequence algorithm to identify matches on a line by line basis. For lines of disassembly that match, relevant profile information of a respective instruction is transferred from the old code profile to a new code profile. A final result is generated that comprises a predicted histogram of machine instructions to be executed and branches to be taken for the target code. A measure that is a proportion of an old histogram that was transferred is calculated. In response to a determination that the measure, e.g., is less than a predetermined threshold, a profile is identified as inaccurate and there is an exit without result. In response to a determination that the measure is, e.g., greater than or equal to a predetermined threshold, a new histogram is generated for the target code as a new profile. The new profile is a predicted profile for the target code.

In one aspect, the predicted profile is analyzed to determine whether the target code may be corrected, improved or optimized. The analyzing is performed, in one example, by an analysis system or performance analysis tool that automatically determines whether certain changes may be made in the code or one or more processors of the computing environment to improve processing, such as increase the speed of processing, reduce the memory used, etc. In one example, machine learning is used to learn about aspects of the target code, and to improve the code; in turn, improving the processing within the processor itself.

Other variations and embodiments are possible.

Figure 5A:
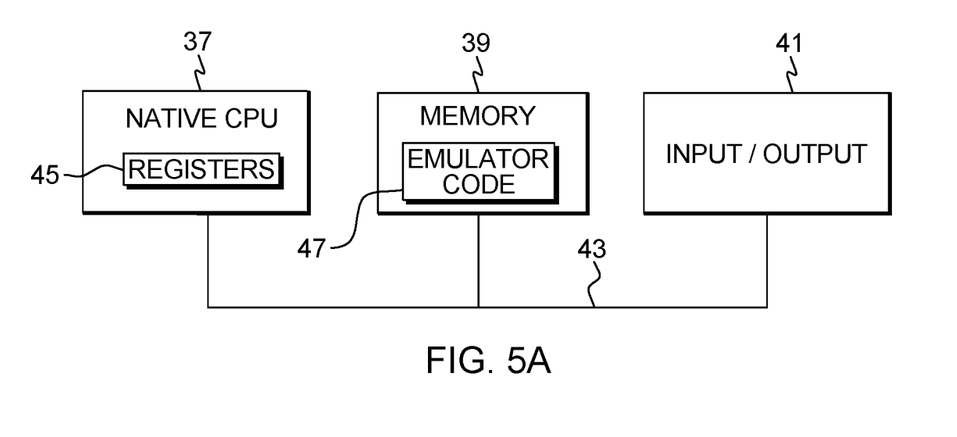
FIG. 5A depicts another example of a computing environment to incorporate and use one or more aspects of the present invention.

Other types of computing environments may also incorporate and use one or more aspects of the present invention, including, but not limited to, emulation environments, an example of which is described with reference to FIG. 5A. In this example, a computing environment 35 includes, for instance, a native central processing unit (CPU) 37, a memory 39, and one or more input/output devices and/or interfaces 41 coupled to one another via, for example, one or more buses 43 and/or other connections. As examples, computing environment 35 may include a PowerPC processor offered by International Business Machines Corporation, Armonk, N.Y.; and/or other machines based on architectures offered by International Business Machines Corporation, Intel, or other companies.

Native central processing unit 37 includes one or more native registers 45, such as one or more general purpose registers and/or one or more special purpose registers used during processing within the environment. These registers include information that represents the state of the environment at any particular point in time.

Moreover, native central processing unit 37 executes instructions and code that are stored in memory 39. In one particular example, the central processing unit executes emulator code 47 stored in memory 39. This code enables the computing environment configured in one architecture to emulate another architecture. For instance, emulator code 47 allows machines based on architectures other than the z/Architecture, such as PowerPC processors, or other servers or processors, to emulate the z/Architecture and to execute software and instructions developed based on the z/Architecture.

Figure 5B:
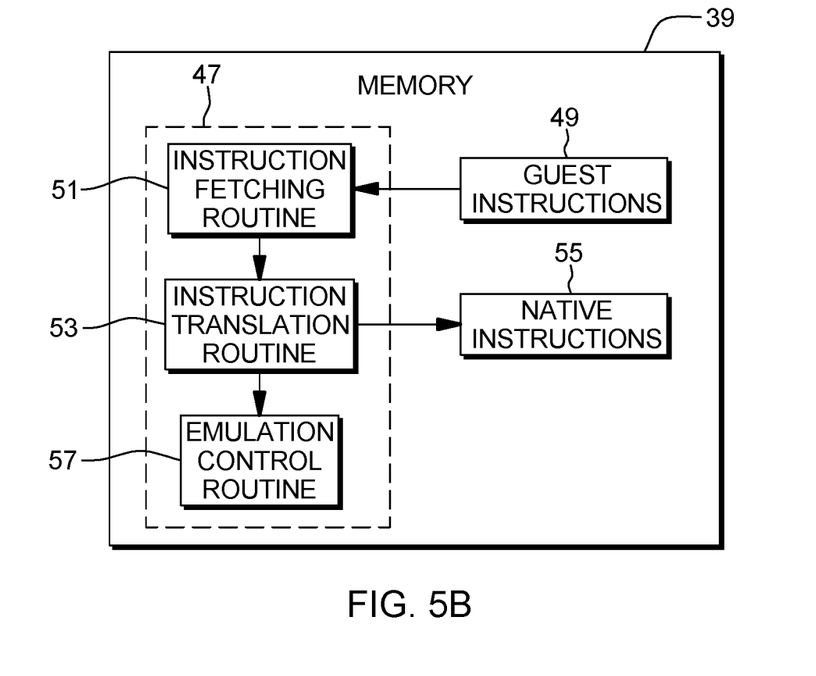
FIG. 5B depicts further details of the memory of FIG. 5A.

Further details relating to emulator code 47 are described with reference to FIG. 5B. Guest instructions 49 stored in memory 39 comprise software instructions (e.g., correlating to machine instructions) that were developed to be executed in an architecture other than that of native CPU 37. For example, guest instructions 49 may have been designed to execute on a z/Architecture processor, but instead, are being emulated on native CPU 37, which may be, for example, an Intel processor. In one example, emulator code 47 includes an instruction fetching routine 51 to obtain one or more guest instructions 49 from memory 39, and to optionally provide local buffering for the instructions obtained. It also includes an instruction translation routine 53 to determine the type of guest instruction that has been obtained and to translate the guest instruction into one or more corresponding native instructions 55. This translation includes, for instance, identifying the function to be performed by the guest instruction and choosing the native instruction(s) to perform that function.

Further, emulator code 47 includes an emulation control routine 57 to cause the native instructions to be executed. Emulation control routine 57 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 55 may include loading data into a register from memory 39; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 45 of the native CPU or by using locations in memory 39. In embodiments, guest instructions 49, native instructions 55 and emulator code 37 may reside in the same memory or may be disbursed among different memory devices.

As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

A guest instruction 49 that is obtained, translated and executed may be, for instance, one of the instructions described herein. The instruction, which is of one architecture (e.g., the z/Architecture), is fetched from memory, translated and represented as a sequence of native instructions 55 of another architecture (e.g., PowerPC, Intel, etc.). These native instructions are then executed.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
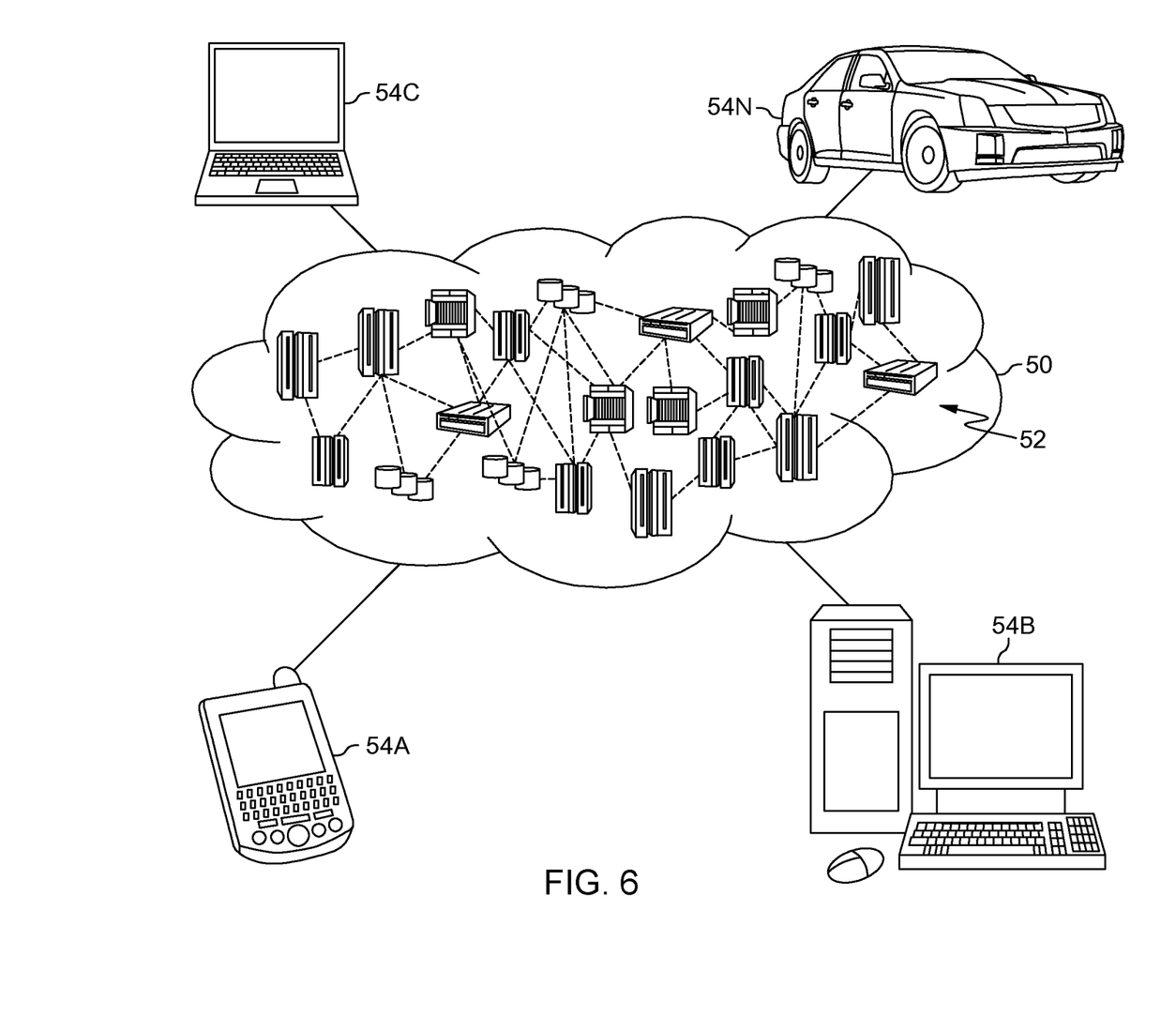
FIG. 6 depicts one embodiment of a cloud computing environment.

Referring now to FIG. 6, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 52 and cloud computing environment 50 can communicate with any type of computerized device over any type of network and/or network addressable connection (e.g., using a web browser).

Figure 7:
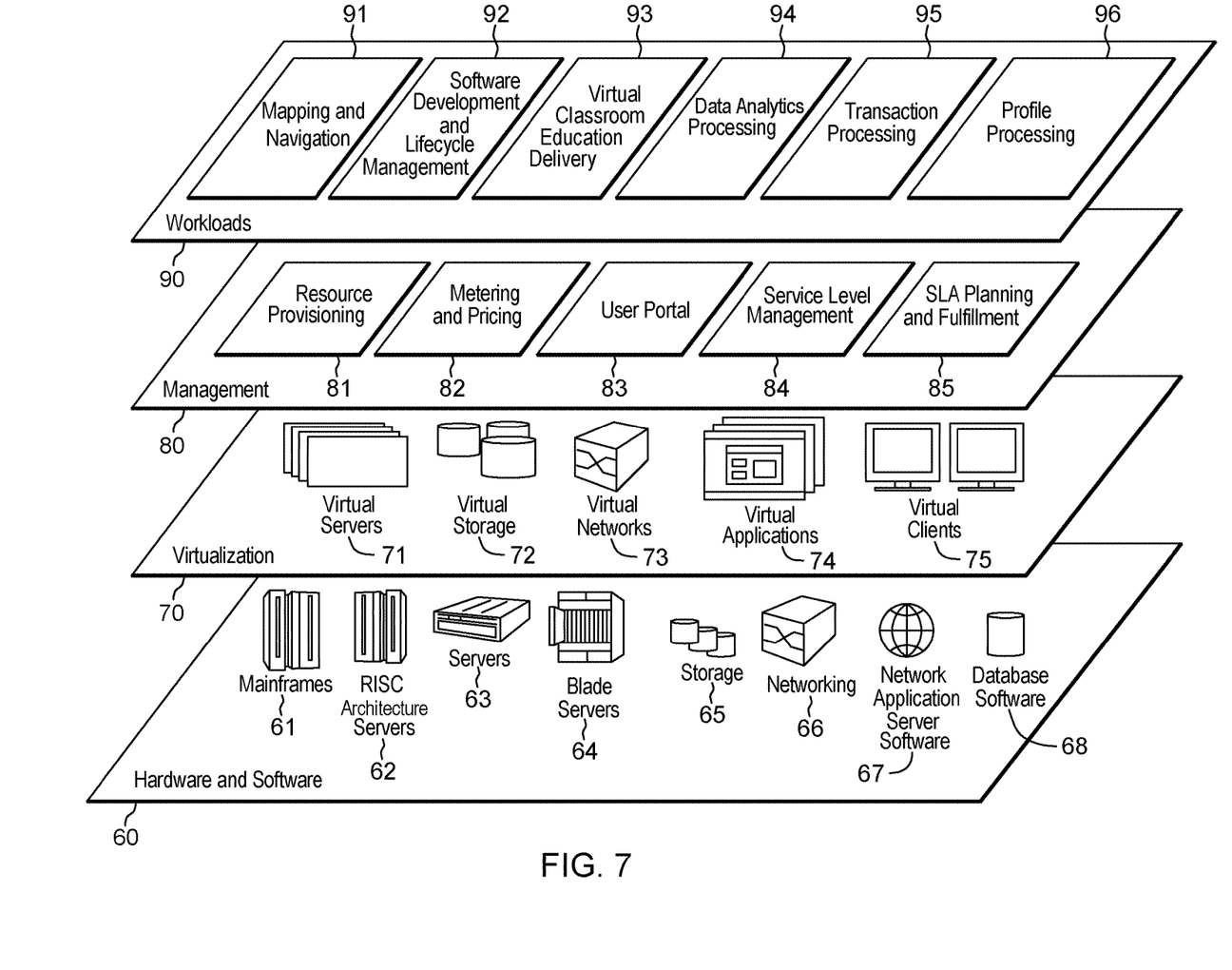
FIG. 7 depicts one example of abstraction model layers.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and profile processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who ioffers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions or operations may be used. Additionally, different types of profiling or analysis tools may be used, as well as different types of measures or thresholds. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
    a computer readable storage medium readable by a processor and storing instructions for performing a method comprising:
        generating a predicted profile for target code to be executed on the processor of the computing environment, the predicted profile being based on a profile of sampled code, the sampled code being a different version of code than the target code and being a complex build of modules for which it is difficult to determine which versions of the modules have been profiled, wherein the profile of the sampled code includes disassembled instructions of the sampled code and information relating to the disassembled instructions of the sampled code, and wherein the generating the predicted profile for the target code includes: providing disassembled instructions of the target code; and determining, based on the profile of the sampled code and the disassembled instructions of the target code, the predicted profile for the target code;
        determining, based on the predicted profile for the target code, predicted execution information for the target code, wherein the determining the predicted profile comprises: checking whether a disassembled instruction of the target code is a disassembled instruction of the sampled code; and transferring, from the profile of the sampled code to the predicted profile for the target code, a count for the disassembled instruction of the sampled code to a count for the corresponding disassembled instruction of the target code; and
        performing an action, based on determining the predicted execution information for the target code, to facilitate processing within the computing environment.

2. The computer program product of claim 1, wherein the information relating to the disassembled instructions of the sampled code comprises one or more counts of instructions for one or more of the disassembled instructions of the sampled code.

3. The computer program product of claim 1, wherein the method further comprises:
    checking accuracy of the predicted profile for the target code; and
    performing the determining the predicted execution information for the target code, based on the checking indicating the predicted profile for the target code is considered accurate.

4. The computer program product of claim 3, wherein the checking accuracy comprises:
    determining a measure of disassembled instructions of the predicted profile for the target code that are the same in the profile of the sampled code;
    comparing the measure to a threshold; and
    considering the predicted profile for the target code to be accurate, based on the measure having a predetermined relationship with respect to the threshold.

5. The computer program product of claim 4, wherein the measure comprises a proportion and the predetermined relationship comprises less than.

6. The computer program product of claim 1, wherein the determining the predicted execution information comprises determining one or more execution hotspots of the target code or central processing unit time for execution of the target code.

7. The computer program product of claim 1, wherein the performing an action comprises initiating analysis of the predicted profile to improve the target code and processing within the computing environment.

8. The computer program product of claim 1, wherein the predicted profile includes a plurality of instructions of the target code, and for each instruction of the plurality of instructions, a count of a number of times the instruction is predicted to be sampled in the target code.

9. A computer system for facilitating processing within a computing environment, the computer system comprising:
    a memory; and
    a processor in communication with the memory, wherein the computer system is configured to perform a method comprising:
    generating a predicted profile for target code to be executed on a processor of the computing environment, the predicted profile being based on a profile of sampled code, the sampled code being a different version of code than the target code and being a complex build of modules for which it is difficult to determine which versions of the modules have been profiled, wherein the profile of the sampled code includes disassembled instructions of the sampled code and information relating to the disassembled instructions of the sampled code, and wherein the generating the predicted profile for the target code includes: providing disassembled instructions of the target code; and determining, based on the profile of the sampled code and the disassembled instructions of the target code, the predicted profile for the target code;
    determining, based on the predicted profile for the target code, predicted execution information for the target code, wherein the determining the predicted profile comprises: checking whether a disassembled instruction of the target code is a disassembled instruction of the sampled code; and transferring, from the profile of the sampled code to the predicted profile for the target code, a count for the disassembled instruction of the sampled code to a count for the corresponding disassembled instruction of the target code; and
    performing an action, based on determining the predicted execution information for the target code, to facilitate processing within the computing environment.

10. The computer system of claim 9, wherein the information relating to the disassembled instructions of the sampled code comprises one or more counts of instructions for one or more of the disassembled instructions of the sampled code.

11. The computer system of claim 9, wherein the method further comprises:
    checking accuracy of the predicted profile for the target code; and
    performing the determining the predicted execution information, based on the checking indicating the predicted profile for the target code is considered accurate.

12. The computer system of claim 9, wherein the determining the predicted execution information comprises determining one or more execution hotspots of the target code or central processing unit time for execution of the target code.

13. The computer system of claim 9, wherein the performing an action comprises initiating analysis of the predicted profile to improve the target code and processing within the computing environment.

14. The computer system of claim 9, wherein the predicted profile includes a plurality of instructions of the target code, and for each instruction of the plurality of instructions, a count of a number of times the instruction is predicted to be sampled in the target code.

15. A computer-implemented method of facilitating processing within a computing environment, the computer-implemented method comprising:

generating, by a processor, a predicted profile for target code to be executed on a processor of the computing environment, the predicted profile being based on a profile of sampled code, the sampled code being a different version of code than the target code and being a complex build of modules for which it is difficult to determine which versions of the modules have been profiled, wherein the profile of the sampled code includes disassembled instructions of the sampled code and information relating to the disassembled instructions of the sampled code, and wherein the generating the predicted profile for the target code includes: providing disassembled instructions of the target code; and determining, based on the profile of the sampled code and the disassembled instructions of the target code, the predicted profile for the target code;

determining, based on the predicted profile for the target code, predicted execution information for the target code, wherein the determining the predicted profile comprises: checking whether a disassembled instruction of the target code is a disassembled instruction of the sampled code; and transferring, from the profile of the sampled code to the predicted profile for the target code, a count for the disassembled instruction of the sampled code to a count for the corresponding disassembled instruction of the target code; and performing an action, based on determining the predicted execution information for the target code, to facilitate processing within the computing environment.

16. The computer-implemented method 15, wherein the information relating to the disassembled instructions of the sampled code comprises one or more counts of instructions for one or more of the disassembled instructions of the sampled code.

17. The computer-implemented method of claim 15, wherein the method further comprises:

checking accuracy of the predicted profile for the target code; and performing the determining the predicted execution information, based on the checking indicating the predicted profile for the target code is considered accurate.

18. The computer-implemented method of claim 15, wherein the determining the predicted execution information comprises determining one or more execution hotspots of the target code or central processing unit time for execution of the target code.

19. The computer-implemented method of claim 15, wherein the performing an action comprises initiating analysis of the predicted profile to improve the target code and processing within the computing environment.

20. The computer-implemented method of claim 15, wherein the predicted profile includes a plurality of instructions of the target code, and for each instruction of the plurality of instructions, a count of a number of times the instruction is predicted to be sampled in the target code.

* * * * *